Aug. 30, 1966  R. W. ANTHONY  3,269,020
MEASURING DEVICE
Filed Dec. 8, 1964
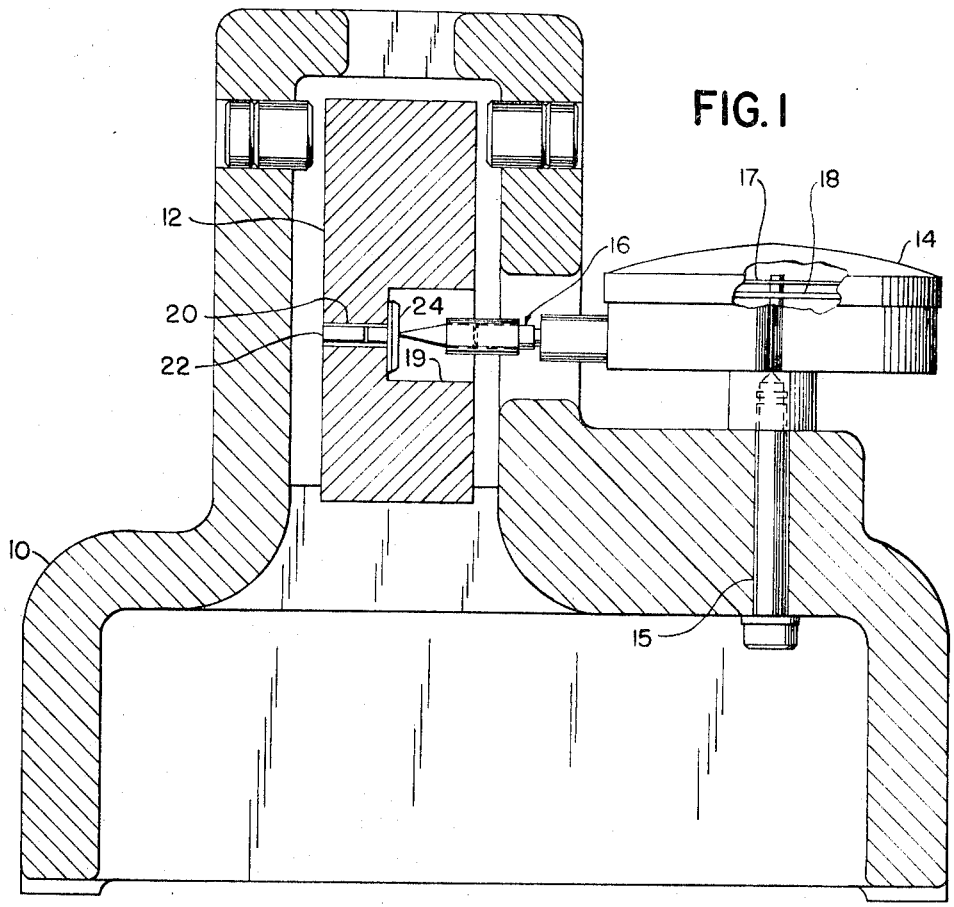
FIG. I
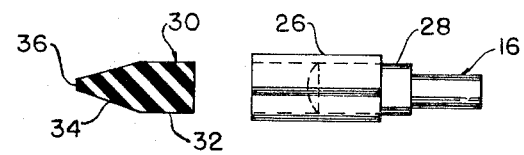
FIG. 3    FIG. 2
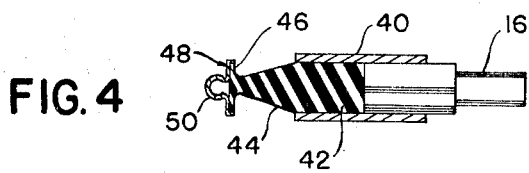
FIG. 4
INVENTOR.
RUSSEL W. ANTHONY
BY
ATTORNEYS

United States Patent Office 3,269,020
Patented August 30, 1966

3,269,020
MEASURING DEVICE
Russel W. Anthony, Detroit, Mich., assignor to National Broach & Machine Company, Detroit, Mich., a corporation of Michigan
Filed Dec. 8, 1964, Ser. No. 416,780
22 Claims. (Cl. 33—172)

The present invention relates to a measuring device.

It is an object of the present invention to provide a measuring device which includes means for eliminating minor transient variations from a basic condition.

It is a further object of the present invention to provide a measuring device for measuring movement of a movable member comprising means for eliminating response to minor transient variations from a position to be measured.

It is a further object of the present invention to provide a measuring device for sensing the position and movement of a movable member including means for rendering the measuring device insensitive to transient deviations in the position of said member.

More specifically, it is an object of the present invention to provide a measuring device responsive to the movement and position of a movable member which comprises an actuator movable in accordance with the movement of the movable member, and resilient means interposed between the actuator and movable member to absorb and eliminate the effect of transient limited movements of said movable member from its instantaneous position.

It is a further object of the present invention to provide a device as described in the preceding paragraph in which the resilient means is formed of a soft elastomeric material, either natural or synthetic.

It is a further object of the present invention to provide a device as described in the preceding paragraph in which said resilient means includes a tapered tip of a rubber-like material.

It is a further object of the present invention to provide a device as described in the preceding paragraph in which the material of the tapered tip has internal friction to absorb and dampen movements of the movable member similar to vibration thereof.

Other objects and features of the invention will become apparent as the description proceeds, especially when taken in conjunction with the accompanying drawings, illustrating preferred embodiments of the invention, wherein:

FIGURE 1 is an elevational sectional view of measuring equipment including the measuring device of the present invention.

FIGURE 2 is an enlarged elevational view of the tip supporting sleeve.

FIGURE 3 is a sectional view of the tip carried by the sleeve.

FIGURE 4 is a fragmentary sectional view of a modification of the invention.

Referring now to the drawings, the invention is illustrated as applied to a checking instrument such for example as a gear checker, which comprises a frame 10 which supports an arm 12 for movement to the right and left as seen in FIGURE 1. Conveniently, the arm 12 may be supported on a vertical pivot on the frame 10. A typical use of the instrument is in checking various parameters of a gear such for example as size, eccentricity, tooth action, tooth spacing, and the presence of nicks and burrs. In such an instrument the gear to be tested may be rotated in mesh with a master gear, one of the gears being supported on the arm 12 at a point remote from its pivot axis. If the axes of the work gear and master gear are both vertical, and if the work gear is eccentric, it will be apparent that the arm 12 will be given a slow back and forth oscillatory motion in timed relation to rotation of the gear. If however, there is improper tooth action due to one cause or another, there may be a transient movement of the arm 12 from its instantaneous position as determined by the zone of mesh with the work gear as each tooth passes through the zone of contact. In some cases the result of this will be that the arm 12 will assume a position determined by the size of pitch diameter of the work gear and will oscillate slowly back and forth from this position during each revolution of the work gear. Superimposed upon this latter movement may be a transient relatively minor movement of the arm 12 as each tooth of the work gear passes through the zone of mesh. This transient relatively limited movement of the arm 12 is generally equivalent to a vibratory motion thereof.

If these transient movements of the arm 12, which normally represent minor departures from the basic instantaneous position as determined by size and eccentricity of the work gear, are allowed to affect a measured instrument, undesirable results may be obtained.

Referring again to FIGURE, 1, the frame 10 carries a measuring device 14 bolted or otherwise secured thereto as indicated at 15, which may be in the form of a conventional dial indicator having a plunger 16 suitably geared to an indicating pointer 17 movable over the dial 18 of the indicator as is familiar in the art. The measuring device in addition to indicating the dimensions and variations in the dimensions of a work gear, may also include switch contacts (not shown) capable of operating signals or controlling devices such as gear separators associated with conveyors so as to separate gauged gears in accordance with measured characteristics.

The arm or lever 12 is provided with a recess 19 and an opening 20 which receives the stem 22 carried by a hardened disc 24 the front surface of which occupies the plane containing the center-line of the arm. Accordingly, movement of the contact surface 24 of the disc in either direction from the position shown is strictly perpendicular to the axis of the plunger 16.

If the plunger 16 itself were allowed to contact the surface of the hardened disc 24, the minor and transient variations in the position of the arm or lever 12 would be transmitted to the pointer of the indicator and would cause the pointer to appear to flutter rapidly around some intermediate position, thus rendering the average position of the pointer difficult if not impossible to read.

In accordance with the present invention means are interposed between the surface of the plate or disc 24 and the plunger 16 which absorbs these transient variations in the parameter being measured. Specifically, this means comprises a cylindrical sleeve 26 seen in FIGURE 2, which is pressed over the contact element 28 at the end of the plunger 16. Located within the sleeve 26 is a soft rubber element 30 seen in FIGURE 3, which includes a cylindrical portion 32 engaged in the forward end of the sleeve 26, and an outwardly extending conically tapered portion 34 which terminates in a flat end land 36.

The rubber element 32 may be formed of natural or synthetic rubber, such for example as Neoprene. The rubber is relatively soft having a Shore "A" Durometer hardness of between 50 and 90. The tapered end portion 34 of the rubber element is tapered to have an included angle between 15 and 45 degrees.

Excellent results have been obtained when the rubber element 30 is formed from 3/16 inch diameter stock having a Shore "A" Durometer hardness of 70, the tapered end portion is conically tapered and has a length of 3/8 inch, an included angle of approximately 20 degrees, and a flat end land of 1/32 inch diameter.

It will of course be understood that the plunger 16 of the indicator 14 is spring biased outwardly by a very light spring so that in the null or rest position the tip 34 of the rubber element is under a very slight compression, normally a few ounces.

The rubber element is yieldable but substantially perfectly resilient. However, internal friction within the rubber is such that there is no appreciable tendency for the resilient material or the elements connected thereto to vibrate.

Accordingly, as the arm or lever 12 moves relatively slowly back and forth in accordance with a gradually changing parameter of a work gear, such as its measured diameter if eccentricity exists, the indicator or measuring device 14 is rendered substantially insensitive to the transient movements of the arm or lever 12 due to conditions such for example as tooth action or minor nicks and burrs on the teeth of the gear. It has been found that the addition of this rubber tip causes the pointer on the indicator to move with apparent steadiness or to remain apparently motionless even though the arm 12 may be undergoing a relatively rapid vibration-like back and forth movement.

It will of course be appreciated that with changing conditions the physical dimensions and characteristics of the tip may be changed to produce the required results. Thus for example, the cone angle may be varied as required by changes in the hardness of the rubber tip and either or both of these conditions may be changed in accordance with the strength of the resilient means urging the indicator plunger 16 outwardly thereof.

Referring now to FIGURE 4 there is illustrated a modification of the present invention. In this case the indicator plunger 16 carries a sleeve 40 which receives a rubber element 42 having a forwardly tapered portion 44 which terminates at its forward end in a cylindrical head 46 carrying a light metallic button 48 having a contact portion 50. The button 48 may if desired be formed of aluminum or magnesium and it may be of thin sheet metal with the forward rounded contact portion 50 hollow to minimize weight.

The operation of this embodiment of the invention is exactly the same as above described, the portion of the rubber element 42 between the sleeve 40 and the button 48 being designed to absorb transient movements imparted to the contact portion 50 by the movable member whose position and changes in position are to be sensed by the measuring device.

The simple form of the invention described in the foregoing comprises essentially a tapered tip of a relatively soft elastomer which is under light compressive loading. It will of course be apparent that the invention is capable of being practiced in a device in which the resilient element may be stressed in tension or torsion.

The drawings and the foregoing specification constitute a description of the improved measuring device in such full, clear, concise and exact terms as to enable any person skilled in the art to practice the invention, the scope of which is indicated by the appended claims.

What I claim as my invention is:

1. A measuring device comprising a support, a movable element carried by said support, a movable actuating member carried by said support, motion transmitting connections between said member and element, and yieldable highly resilient contact means on said member engageable with a surface the position and movement of which is to be sensed, said resilient means being a soft elastomer characterized by sufficient energy absorption to prevent substantial vibration of said element.

2. A device as defined in claim 1 in which said resilient means is a soft elastomer having a Shore A Durometer hardness of 50–90.

3. A device as defined in claim 1 in which said resilient means is an elongated elastomeric body.

4. A device as defined in claim 1 in which said resilient means is an elongated tapered elastomeric body.

5. An indicator having a dial, a pointer movable over the dial, a plunger having an outer end normally engageable with a work surface, gearing connecting said plunger and pointer, light spring means urging said plunger outwardly, and an elastomeric contact element at the outer end of said plunger.

6. An indicator as defined in claim 5 in which said element is elongated in the direction of movement of said plunger.

7. An indicator as defined in claim 5 in which said element is elongated and tapered in the direction of movement of said plunger.

8. An indicator as defined in claim 7 in which the outer end of said element has a flat contact approximately 1/32 inch wide.

9. An indicator as defined in claim 7 in which said element is tapered at an included angle of 15–45 degrees.

10. An indicator as defined in claim 7 in which the outer end of said element has a flat contact approximately 1/32 inch wide and in which said element is tapered at an included angle of 15–45 degrees.

11. An indicator as defined in claim 6 in which said element has a Shore A Durometer hardness of 50–90.

12. A dial indicator having an actuating plunger and a tapered soft rubber tip on said plunger for engagement with a movable surface.

13. An indicator as defined in claim 12 in which said tip has a Shore A Durometer hardness of 50–90.

14. An indicator as defined in claim 12 in which said tip has a contact area at its outer end about 1/32 inch wide.

15. An indicator as defined in claim 12 in which said tip has an included angle of 15–45 degrees.

16. An indicator as defined in claim 12 in which said tip has a Shore A Durometer hardness of 50–90 and a contact area at its outer end about 1/32 inch wide.

17. An indicator as defined in claim 12 in which said tip has a Shore A Durometer hardness of 50–90, a contact area at its outer end about 1/32 inch wide, and an included angle of 15–45 degrees.

18. A device responsive to movement of a member comprising a movable element having predetermined positions corresponding to the positions occupied by the member and movable in an amount and in a sense corresponding to movement of the member, actuating connections extending from the member to said element when said device is in use, said connections including lightly stressed, yieldable, highly resilient means capable of transmitting movement to said element upon a change in the average position of the member but not transient movements thereof, said resilient means being a soft elastomer characterized by sufficient energy absorption to prevent substantial vibration of said element.

19. A device as defined in claim 18 in which said resilient means is a soft elastomer having a Shore A Durometer hardness of 50–90.

20. A device as defined in claim 18 in which said resilient means is an elongated elastomeric body.

21. A device as defined in claim 18 in which said body is under a light compressive load.

22. A device as defined in claim 18 in which said resilient means is a tapered elongated elastomeric body under a light compressive load.

References Cited by the Examiner
UNITED STATES PATENTS

| | | | |
|---|---|---|---|
| 2,533,522 | 12/1950 | Sisson | 33—172 |
| 2,649,010 | 8/1953 | Corry | 73—529 X |
| 2,754,435 | 7/1956 | Ongaro | 73—71.4 X |
| 2,819,531 | 1/1958 | Hixson | 33—172 |
| 3,090,128 | 5/1963 | Pappas | 33—179.52 |

FOREIGN PATENTS

| | | |
|---|---|---|
| 363,591 | 3/1921 | Germany. |
| 826,687 | 1/1960 | Great Britain. |
| 924,221 | 4/1963 | Great Britain. |

LEONARD FORMAN, *Primary Examiner.*

ISAAC LISANN, B. A. DONAHUE,
*Assistant Examiners.*